(12) United States Patent
Wallach

(10) Patent No.: US 7,807,251 B1
(45) Date of Patent: Oct. 5, 2010

(54) SMART COATING SYSTEM—AIRCRAFT DEICING & PERISCOPE DEFOULING

(76) Inventor: Morton L. Wallach, 187 Ledgewood Rd., Apt. 407, Groton, CT (US) 06340

( * ) Notice: Subject to any disclaimer, the term of this patent is extended or adjusted under 35 U.S.C. 154(b) by 305 days.

(21) Appl. No.: 11/972,204

(22) Filed: Jan. 10, 2008

Related U.S. Application Data

(63) Continuation-in-part of application No. 11/093,478, filed on Mar. 30, 2005, now Pat. No. 7,390,560.

(60) Provisional application No. 60/884,458, filed on Jan. 11, 2007, provisional application No. 60/941,548, filed on Jun. 1, 2007, provisional application No. 60/987,536, filed on Nov. 13, 2007, provisional application No. 60/558,880, filed on Apr. 2, 2004, provisional application No. 60/635,173, filed on Dec. 10, 2004.

(51) Int. Cl.
*B32B 5/16* (2006.01)
*B32B 7/06* (2006.01)
*B32B 17/06* (2006.01)
*B32B 27/40* (2006.01)
*B32B 33/00* (2006.01)

(52) U.S. Cl. .................... 428/157; 428/212; 428/305.5; 428/332; 428/423.1; 428/702

(58) Field of Classification Search ...................... None
See application file for complete search history.

(56) References Cited

U.S. PATENT DOCUMENTS 3,938,266 A * 2/1976 Cook .......................... 36/19.5

* cited by examiner

*Primary Examiner*—Ramsey Zacharia
(74) *Attorney, Agent, or Firm*—Mark Nowotarski

(57) ABSTRACT

Coating array technology is demonstrated for applications in aircraft ice removal in-situ, and for submarine periscope head window to remove fouling and provide enhanced optical features. The coating arrays comprise a first layer and a second layer with an adhesive interface therebetween. The first layer separates from the second layer upon application of energy to the interface. The method is applicable to many areas including ship antifouling, medical antifouling (antibacterial), chemical biological warfare agent removal, anti-corrosion, etc. It can be applied to substrates including: ships, vehicles (cars), windows, walls of buildings, clothing, etc.

13 Claims, 3 Drawing Sheets

SMART COATING SYSTEM—AIRCRAFT DEICING & PERISCOPE DEFOULING

CROSS-REFERENCE TO RELATED APPLICATION

This application claims the benefit of US provisional patent application "Aircraft and Periscope Coating Arrays", Ser. No. 60/884,458, filed Jan. 11, 2007. Said patent application is incorporated herein by reference.

This application claims the benefit of US provisional patent application "Micro-Sensor Applications De-ice/Defoul, Tamper Proofing, Trace Explosive Sampling", Ser. No. 60/941,548, filed Jun. 1, 2007. Said patent application is incorporated herein by reference.

This application claims the benefit of US provisional patent application "Deice/Decontamination Coating Arrays", Ser. No. 60/987,536, filed Nov. 13, 2007. Said patent application is incorporated herein by reference.

This application is a continuation in part of U.S. nonprovisional patent application Ser. No. 11/093,478, filed Mar. 30, 2005 now U.S. Pat. No. 7,390,560, and entitled "Surface Renewal of Antifouling Coating on Command". Said patent application Ser. No. 11/093,478 claims priority to US provisional patent application "Surface Renewal of Antifouling Coating on Command", Ser. No. 60/558,880, filed Apr. 2, 2004. Said patent application Ser. No. 11/093,478 claims priority to US provisional patent application "Smart Self-Renewable Medical Stent Coatings", Ser. No. 60/635,173, filed Dec. 10, 2004. All of said patent applications are incorporated herein by reference.

FIELD OF INVENTION

This invention is in the field of multilayer composite polymer coatings.

BACKGROUND

In both fixed wing and rotor aircraft, deicing is an ongoing technical challenge.

Current fixed wing aircraft utilize various methods to prevent ice formation on wing and engine inlet surfaces. These methods include pneumatic, electrostatic, and thermal systems. Not all of these methods are applicable to every surface and ice formation continues to be a problem. This can result in ice breaking off and damaging the aircraft (i.e., ice formation on projections in engine inlets can lead to engine fan blade damage when accumulated ice becomes detached and goes down the inlet). In the worst cases, pilot and passenger safety is compromised.

Current rotor aircraft UH-60 Black Hawk and AH-64A Apache utilize electro-thermal systems to remove ice where blade leading edges are heated by wires embedded in the leading edge composite under a titanium wear strip. Problems such as wire burn out, and controller failure can lead to leading edge overheating, causing damage to composites and blade delamination. Leading edge damage from excessive heat has been a problem with the Apache AH-64A. Because of unreliability and demanding power requirements, the system is often not used or permanently disabled, and the UH-60 Black Hawk operators manual states that blade de-ice operation with system installed may cause blade damage.

At present, ground or air de-icing causes mission delays and missed forecasts. Actual in-flight icing causes mission cancellations and abortions. The Army Safety Office data indicates that icing problems occur often and likely cause millions of dollars in damage and loss of life.

Other methods which have been used or tested have specific limitations and caveats. These methods include the Pneumatic Boot (requires increased torque), Fluid Anti-icing System (limited amount of fluid & use time because of weight).

In a related application, submarine periscope window fouling is also an ongoing problem.

SUMMARY OF THE INVENTION

The Summary of the Invention is provided as a guide to understanding the invention. It does not necessarily describe the most generic embodiment of the invention or all species of the invention disclosed herein.

The invention comprises applications of multilayer coatings for airplane or rotor deicing (helicopter) and submarine periscope defouling. The outer layer of said coatings may be removable by application of a signal, such as an electrical signal, pressure signal or heat signal.

DETAILED DESCRIPTION

The following detailed description discloses various embodiments and features of the invention. These embodiments and features are meant to be exemplary and not limiting.

Aircraft Deicing

Figure 1:
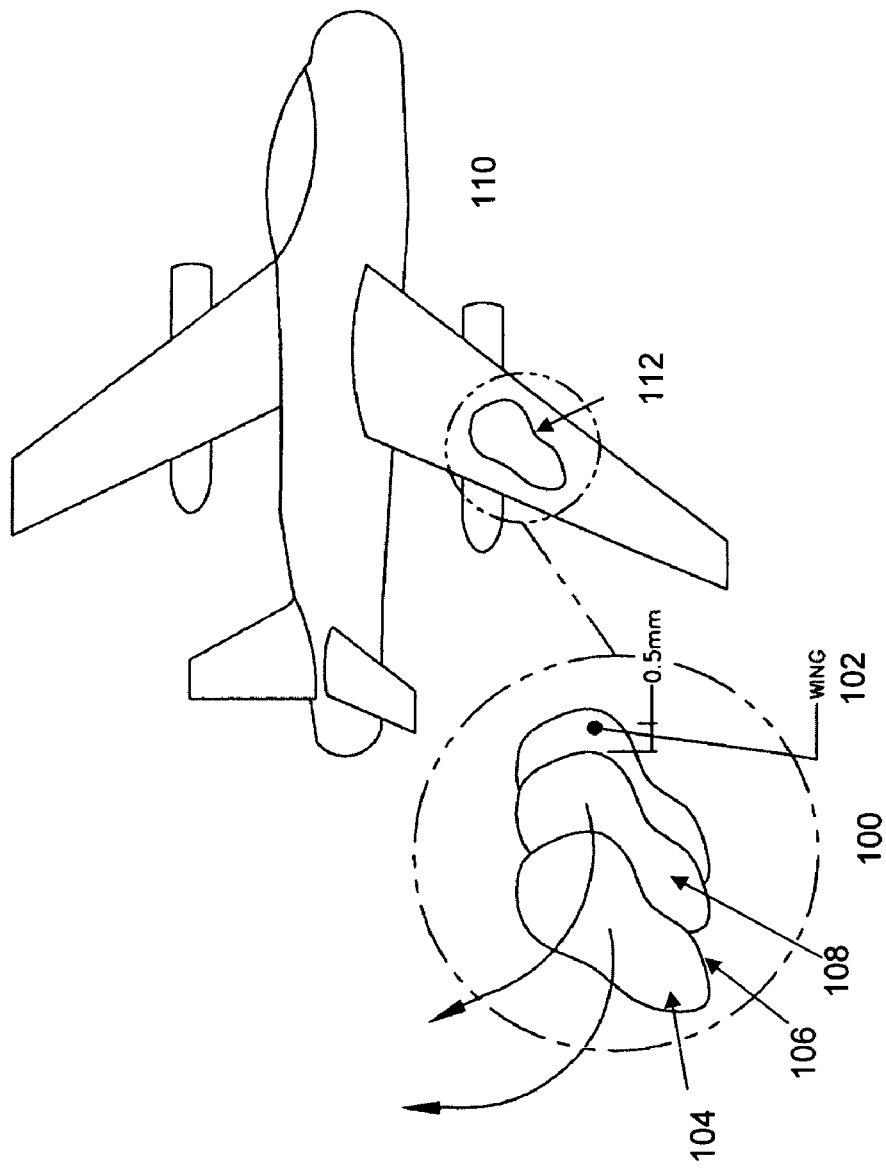
FIG. 1 is an illustration of the application of sheddable multilayer coatings to airplane wing deicing.

Referring to FIG. 1, a coating array system 100 of thin polymer film layers is applied to an aircraft 110 substrate 102 wherein the ice containing top layer 104 is releasable on command. Release is achieved in flight (or on ground) by application of a small electrical energy or heat input to the interface 106 between top layer and second layer 108 of the coating array. The energy input will heat up the interface and break the tailored bond between layers. Compatibilities with future low observables should be obtainable. Application of the array can be achieved by ordinary methods such as adhesive or pressure coating.

The number of layers, size, and thickness are chosen to provide appropriate film properties, performance, safety, and period of service (e.g., months/layer). Optimum parameters are established to minimize ice breaking off and damaging the aircraft (e.g., film size, location, ice weight, etc). The layer interface chemistry is designed to bond satisfactorily and de-bond at selected electrical energy or heat input.

The array is adhered to the aircraft at selected locations 112 with bond strength adequate for flight conditions. Layers are thin (~0.1 to 3 mm) and electrically conductive if necessary. The array is composed of readily available polymer film or sheet material. Polyurethane is preferred to conform with current aircraft coatings.

The final coating array is smooth without increase in drag or weight, easily strippable, and does not alter the paint colors and optical properties of the painted aircraft surface. With renewable layers, cleaning or repairing of layers will not be necessary. If required, the array will be recessed (1-2 mm) into the surface to eliminate drag.

Heat or electrical energy, input uniformly over the layer interface, can be obtained from the aircraft service system via an electrical or thermal connection to one or more of said interfaces or layers. 3M Electrically Conductive Adhesive Tape (9713) is an example of a convenient way to introduce electricity/heat into the interface.

Other two-sided adhesive tapes are readily available from 3M Company and Henkel-Loctite in a variety of adhesive strength and conductivity levels, e.g., 3M High Strength Double Coated Tape with acrylic adhesive 300SE (9490LE, 9496LE). In 9496LE one side has a weaker adhesive (targeted for the releasable interface).

The adhesive on each side of the tape can be tailored so that the tape bonds more strongly with the layer that is being shed. Thus the tape itself will be shed along with the layer that is shed. The adhesive that bonds tape to the layer that stays behind may be only as strong as the adhesive typically found on a 3M Post-it® note.

Pressure Activated Deicing

Figure 2:
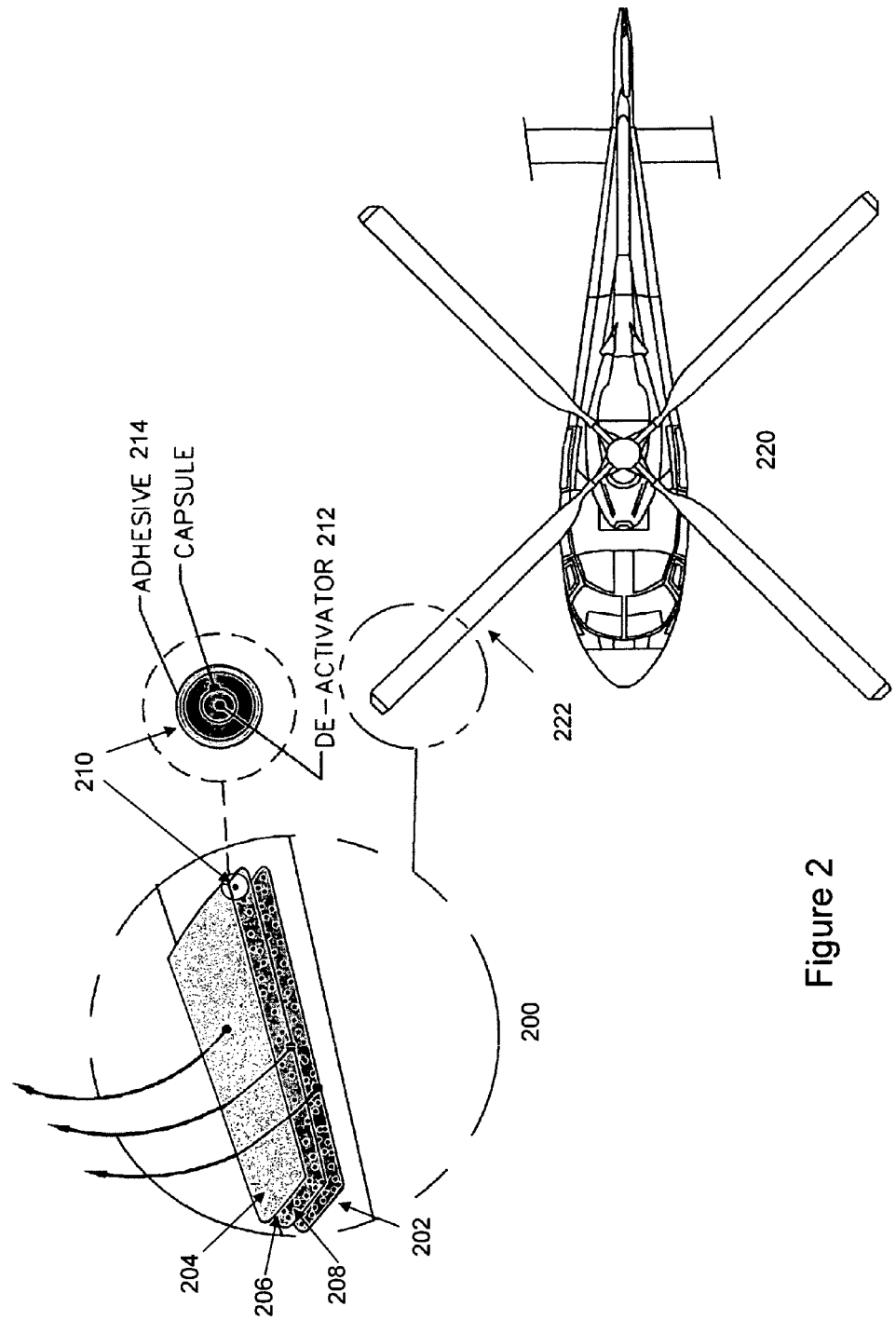
FIG. 2 is an illustration of the application of sheddable multilayer coatings to helicopter rotor blade deicing.

Referring to FIG. 2, a pressure sensitive coating array system 200 of polymer film layers is applied to the rotor blade 222 substrate 202 of a helicopter 220 wherein the ice containing top layer 204 is released automatically. De-icing is achieved in flight or on ground by ice pressure on sensor capsules 210 at the interface 206 between the first 204 and second 208 layer. The ice pressure causes sensor capsules at the layer interface to release chemical deactivator material 212 which deactivates the adhesive 214 binding the film layers. The top layer containing ice on its surface is then released by the motion of the rotor. No electric power is required.

The system has the following features:
1. Array layers are bonded together with adhesive.
2. Pressure sensitive micro capsule material at interface between layers delivers adhesive deactivator.
3. Release is pressure induced by weight of the ice.
4. De-icing occurs on top layer release.
5. The process can be tuned by capsule weight sensitivity to the amount of ice formed in any region
6. Ice can be removed in selected segments over several blade regions.
7. Layers are relatively thin polymeric material (~2-6 mils), The number of layers, size, thickness and enhancements are chosen to provide appropriate film properties, performance, safety, and period of service (e.g., months/layer). Optimum parameters are established to minimize ice breaking off and damaging the aircraft (e.g., film size, location, ice weight, etc). The layer interface chemistry is designed to bond satisfactorily and de-bond at selected levels of ice formation.

The array is adhered to the substrate aircraft at selected locations with anchored bond strength adequate for flight conditions. Layers are of good physical and chemical integrity. The array is composed of polymer film materials with the desired use properties including ability to withstand sand and rain erosion. Polyurethane is preferred to conform to current aircraft coatings.

The final coating array is smooth without unacceptable increase in drag, or weight, easily strippable, and does not alter the physical properties of the rotor surface. With renewable layers, cleaning or repairing of layers should not be necessary. If required, the array can be recessed (1-2 mm) into the surface to eliminate drag.

The coating array can replace the blade top coat or act as an overcoat. Compatibilities with future low observables are obtainable. Application of the array is achieved by ordinary adhesive methods.

The helicopter rotor blade micro-sensor/coating array method and the Aircraft Deicing method described above are also applicable to decontamination of ship antifouling, medical antifouling (antibacterial), chemical biological warfare agent removal, anti-corrosion, etc. It can be applied to substrates including: ships, vehicles (cars), windows, walls of buildings, clothing, etc.

Rubber-based or hot melt adhesives can be employed in these coating arrays to adhere the various layers of the array. Chlorinated hydrocarbons can be used to deactivate said adhesives thereby releasing the corresponding top layer.

Examples of applicable rubber-based thermoplastic adhesives are butadiene-styrene rubber adhesives and polyisobutylene rubber adhesives. These rubber based adhesives are commonly formulated to give non cross-linking pressure sensitive adhesive materials. They are used extensively in lamination applications.

Butadiene-styrene rubber adhesives are deactivated with chlorinated 230 hydrocarbon or to a less extent ketone deactivators.

Rubber adhesives are supplied in one part, solvent or latex form. These products have a low application viscosity suitable for spray or roll coating. They are activated by evaporation of water or solvent and they can be employed from about −40 to 160 F.

Polyisobutylene rubber adhesives are deactivated with hydrocarbons or chlorinated hydrocarbons. These adhesives offer the advantage over other rubber based adhesives of setting rapidly and not providing volatile emissions required in such applications as decontamination of clothing arrays.

Suitable hot melt adhesives are polyvinyl acetate copolymers. These materials are colorless and transparent and have good performance at operating temperatures up to 160 F and lower, however they have the advantage of good property retention at low temperatures. Grades of higher molecular weight are more dimensionally stable, tough, and of lower solubility. These adhesive materials are available in solid one-part form in sticks or packaged in drums. They are applied molten to the substrate and bond simply by solidification Solvents for polyvinyl acetates include aromatic or chlorinated hydrocarbons, ketones or lower alcohols.

Adhesive deactivators are contained in capsules. Capsules are designed to break and release adhesive deactivator when subject to suitable pressure. Pressure can be applied by a roller device, squeegee device, or by the weight of material (e.g., ice, foulant) on the top layer.

The capsule material will be stable to the deactivator within it and tuned to a required break strength as defined by the material compression strength.

Capsules can be filled with deactivator via capsule polymerization techniques or via automated particle filling systems.

The capsules can have various shapes such as hollow spheres (preferred) or hollow cylinders.

Capsules may be located at the interface, on the adhesive, or on the layer surface, such as on the surface of a second layer and adhesive placed over them such that when the capsules rupture, the adhesive adjacent to the second layer will deactivate preferentially over the adhesive adjacent to the first layer. Thus the adhesive will remain attached to the first layer and be removed when the first layer is removed.

For fouling applications (e.g., of ship hulls or periscope head windows), or deice methods, the activation pressure can be achieved by a roller device rolled (manually or automatically) over the foulant on top layer. This method provides a wide range of activation pressures which accommodates various capsule designs and materials (e.g., engineering or high performance resins of controlled number average molecular weight from 300 to 100,000). Engineering or high performance polymers generally have the required chemical resistance to deactivators.

Capsule sensitivity of lowest minimum activation pressure is located at the top interface so that only the top layer will be released when said lowest minimum activation pressure is applied. Capsules at each additional interface have increasingly higher minimum activation pressures so that layers can be removed one by one using rollers applied at progressively higher minimum activation pressures.

Capsules can also be designed to break (activate) at low pressures such as that exerted by the fouling or ice material on the top layer surface. These capsule materials can be of very low molecular weight natural or synthetic polymers (e.g., 300 to 10,000 number average molecular weight such as soft or medium levels of crosslinked gelatins).

Pressure activated arrays and electrically activated arrays can be combined. For example, pressure activated arrays can be located on one portion of an aircraft and electrically activated arrays can be located on another portion of an aircraft. Thus removal of ice in some locations can be under the control of the pilot (e.g. electrically activated) and in some locations it can be automatic (e.g. pressure activated). In this manner one can quickly correct any imbalance of the aircraft caused by ice.

Periscope Head Window Defouling

Figure 3:
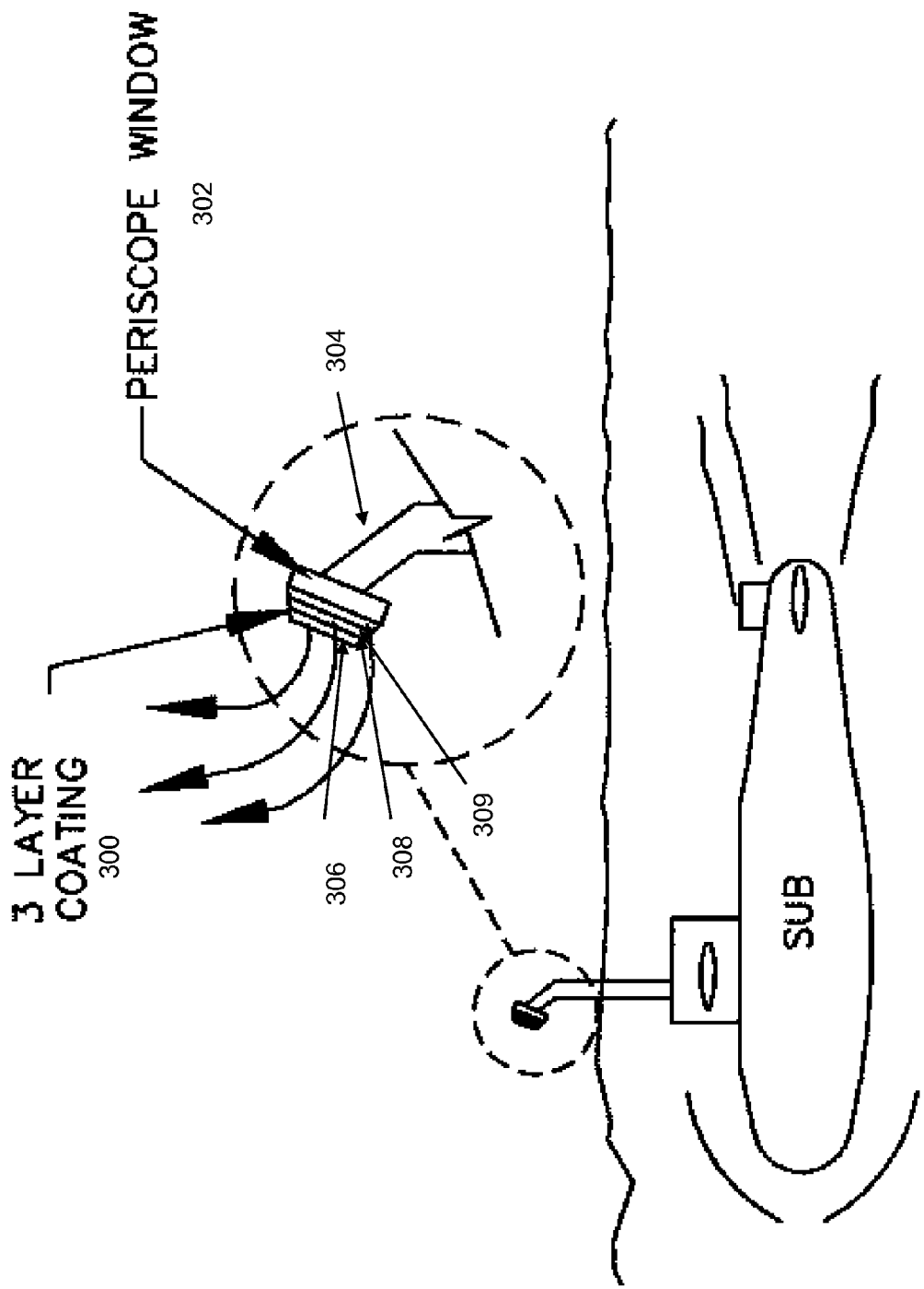
FIG. 3 is an illustration of the application of sheddable multilayer coatings to periscope defouling.

Referring to FIG. 3, a layered coating array system 300 is applied to the silica head window substrate 302 of a submarine periscope 304 wherein the fouled top layer of the array 306 is releasable on command revealing a fresh clean layer. In this manner the surface is kept forever new and head window distortion is eliminated. Release is achieved by application of a small electrical energy or heat input to the interface between top layer and second layer 309. The energy input will heat up the interface 308 and break the tailored weak bond between layers. The layers will be thin (0.1 to 2 mm) or sheet gauge and somewhat conductive if necessary. The arrays are non-hazardous, and environmentally friendly. The pressure method described above may be employed in conjunction with said electrical activation method (e.g. alternating electrically activated and pressure activated layers) or as an alternative.

The number of layers in the array, layer lifetime, and thickness are chosen to provide appropriate properties and period of service (e.g., months/layer) in the operational environment. The layer interface chemistry is designed to bond satisfactorily and de-bond at selected electrical energy or heat input obtained from the submarine service system. The energy input will be uniform throughout the film layer.

The array layers can be composed of readily available hydrophobic, optical quality materials. These materials include polymer film, sheet material (e.g., polysiloxane), and thin optical grade silica glass layer systems. This approach of releasing layers on command has several inherent advantages due to the control of layer quality in-situ and array lifetime including: less fouling, better optical quality, improved water sheddable features, longer possible array life, and little or no cleaning.

The interfacial adhesive or coating layers may contain transparent, electrically conductive materials, such as polythiophene. The thickness can be in the range 335 of 0.1 mils to 5 mils. A preferred range is 0.25 mils to 2 mils.

Multiple layers may be applied in a single coating array. Up to 10 layers is suitable. Up to 4 layers is preferred. The layers may be designed such that the outermost layer is removed prior to the next innermost layer.

This system can be applied to other head window materials such as sapphire, germanium, and spinel. Application of the array to the head window will retain optical quality by employing optical quality thin interfacial adhesive material and application methods. It is preferred that the index of refraction of the layers and adhesives matches the index of refraction of the head window such that there are not internal reflections visible to the naked eye.

The coating array system will not require storage on the submarine. Also, it is unlikely that recoating will be needed on board the submarine since the total array life time will be much longer that current coatings.

A polysiloxane type layer system or other selected polymer or glass array should preferably meet the following requirements: contact angle at least 105 deg, (preferred >150 deg), optical transmission >95% over 300-700 nm, service life of 1 year between applications (note: array life should last longer than current commercially supplied coatings, with each layer employed over shorter duration), minimum micro fouling over 3 months (note: micro fouling per layer expected to be greatly diminished relative to present systems over the shorter chosen time periods), water shedding degradation by no more than 10% over 3 months (note: layer micro fouling is kept to minimum, and therefore water shedding degradation and optical quality is expected to be continuously better that current practice.) Having a contact angle of 105 deg or greater helps insure that water sheds readily from the window.

Because micro fouling is kept to acceptable levels and then the coating is released, cleaning may not be required; at worst it should be much easier, and normal maintenance and procedures employed without damage. Polymeric polysiloxane or thin glass layers should be stable to operational water environment (−40 to 50 C), and thermal shock (66 C air to 20 C water, and −54 C air to 0 C water). These materials are also stable to icing and to sunlight.

In summary the array has the following advantages:
Less fouling
Better optical quality
Less degradation of water shedding
Longer total life of array
Controlled life of layers
Cleaning not required
Little maintenance required
No on-board recoating needed
Overall enhanced performance & maintenance The entire array will be pre-bonded to the surface of the head window with optical quality interfacial adhesive material or simple pressure bonding, and should function over longer periods than previously obtained with 3-Hept or Ameron polysiloxane.

CONCLUSION

Whereas various particular embodiments of the present invention have been described with respect to different applications, a person of ordinary skill in the art will appreciate how various elements of the different embodiments can be applied to a variety of applications in accordance with the requirements of said applications.

I claim:

1. A coating array system for removing contamination from a substrate, said coating array system comprising:
    a. a first layer;
    b. a second layer;
    c. an interface between said first and second layers; and
    d. means for applying a signal to said interface or to at least one of said layers
wherein said signal is of sufficient strength to cause a physical transformation in said array such that at least said first layer debonds from said array thus shedding said first layer and any contamination adhered thereon, and wherein said signal is a pressure signal and said interface comprises:
    e. an adhesive; and
    f. one or more capsules
wherein said one or more capsules contains an adhesive deactivator and wherein said one or more capsules is designed to rupture when a minimum pressure is applied such that said adhesive deactivator is released and deactivates said adhesive such that said first layer debonds from said second layer, and wherein said adhesive is a rubber based adhesive, said deactivator is a chlorinated hydrocarbon, and said capsule material is a soft or moderately crosslinked gelatin with a controlled number average molecular weight in the range of 300 to 100,000.

2. A coating array system for removing contamination from a substrate, said coating array system comprising:
    a. a first layer;
    b. a second layer;
    c. an interface between said first and second layers; and
    d. means for applying a signal to said interface or to at least one of said layers
wherein said signal is of sufficient strength to cause a physical transformation in said array such that at least said first layer debonds from said array thus shedding said first layer and any contamination adhered thereon, and wherein said signal is a pressure signal and said interface comprises:
    e. an adhesive; and
    f. one or more capsules
wherein said one or more capsules contains an adhesive deactivator and wherein said one or more capsules is designed to rupture when a minimum pressure is applied such that said adhesive deactivator is released and deactivates said adhesive such that said first layer debonds from said second layer, and wherein said adhesive is a hot melt adhesive, said deactivator is a hydrocarbon and said capsule material is an engineering resin or high performance resin with a controlled number average molecular weight in the range of 300 to 100,000.

3. The coating array system of claim 2 wherein said number average molecular weight is in the range of 300 to 10,000.

4. A coating array system for removing contamination from a substrate, said coating array system comprising:
    a. a first layer;
    b. a second layer;
    c. an interface between said first and second layers; and
    d. means for applying a signal to said interface or to at least one of said layers
wherein said signal is of sufficient strength to cause a physical transformation in said array such that at least said first layer debonds from said array thus shedding said first layer and any contamination adhered thereon, and wherein said signal is a pressure signal and said interface comprises:
    e. an adhesive; and
    f. one or more capsules
wherein said one or more capsules contains an adhesive deactivator and wherein said one or more capsules is designed to rupture when a minimum pressure is applied such that said adhesive deactivator is released and deactivates said adhesive such that said first layer debonds from said second layer, and wherein said first layer comprises a polymer or glass, said polymer or glass being of optical quality with about the same refractive index as a periscope window and said coating array system further comprises a roller wherein said roller is suitable for applying sufficient pressure signal to said array such that said first layer debonds from said second layer.

5. The coating array system of claim 4 wherein said first layer comprises polysiloxane.

6. A coating array system for removing contamination from a substrate, said coating array system comprising:
    a. a first layer, a second layer and a third layer;
    b. a first interface between said first layer and said second layer;
    c. a second interface between said second layer and said third layer
wherein:
    d. said first interface comprises a first adhesive and one or more first capsules, said first capsules comprising a first adhesive deactivator; and
    e. said second interface comprises a second adhesive and one or more second capsules, said second capsules comprising a second adhesive deactivator
and wherein:
    f. said one or more first capsules is designed to rupture at a first minimum pressure; and
    g. said one or more second capsules is designed to rupture at a second minimum pressure;
and wherein said first minimum pressure is less than said second minimum pressure such that when a deactivating pressure with a magnitude between said first minimum pressure and said second minimum pressure is applied to said coating array, said one or more first capsules will rupture and release said first adhesive deactivator, but said one or more second capsules will not rupture.

7. The coating array system of claim 6 wherein said one or more first capsules are located adjacent to the surface of said second layer such that when said one or more first capsules are ruptured, said first adhesive adjacent to said second layer will deactivate preferentially relative to said first adhesive adjacent to said first layer such that said first adhesive will remain bonded to said first layer when said first layer is removed from said coating array.

8. The coating array system of claim 6 which further comprises up to 10 layers.

9. A coating array system for removing contamination from a substrate, said coating array system comprising:
    a. a first layer;
    b. a second layer;
    c. an interface between said first and second layers; and
    d. means for applying a signal to said interface or to at least one of said layers
wherein said signal is of sufficient strength to cause a physical transformation in said array such that at least said first layer debonds from said array thus shedding said first layer and any contamination adhered thereon, and wherein said coating array system further comprises a portion of a helicopter rotor blade and wherein said first layer is recessed 1-2 mm into the surface of said rotor blade.

10. A coating array system for removing contamination from a substrate, said coating array system comprising:
    a. a first layer;
    b. a second layer;

c. an interface between said first and second layer; and d. means for applying a signal to said interface;

wherein said signal is of sufficient strength to cause a physical transformation in said array such that at least said first layer debonds from said array thus shedding said first layer and any contamination adhered thereon and wherein:

e. said coating array system further comprises a service system of an aircraft;

f. said first layer comprises polyurethane or other similar polymer;

g. said first layer has a thickness in the range of 0.1 to 3 mm;

h. said interface is electrically conductive; and i. said interface comprises an electrical connection to said service system of said aircraft such that an electrical signal can be applied to said interface to provide sufficient heat such that said first layer debonds from said second layer.

11. A coating array system for removing contamination from a substrate, said coating array system comprising:

a. a first layer;

b. a second layer;

c. an interface between said first and second layers; and d. means for applying a signal to said interface wherein said signal is of sufficient strength to cause a physical transformation in said array such that at least said first layer debonds from said array thus shedding said first layer and any contamination adhered thereon, and wherein:

e. said coating array system further comprises a head window of a periscope of a submarine and a service system of said submarine;

f. said first layer comprises an optical quality material with a thickness in the range of 0.1 to 2 mm and an index of refraction that is sufficiently close to that of said head window such that internal reflections are not visible to the naked eye;

g. said second layer comprises optical quality adhesive material;

h. said interface is electrically conductive;

i. said second layer has a thickness in the range of 0.1 to 4 mils;

j. said second layer has an index of refraction that is sufficiently close to the index of refraction of said head window such that internal reflections are not visible to the naked eye; and k. said interface comprises an electrical connection to said service system of said submarine such that an electrical signal can be applied to said interface causing sufficient heat generated for said first layer and second layer to debond from said substrate.

12. The coating array system of claim 11 wherein said head window comprises one or more of silica, sapphire, germanium or spinel.

13. The coating array system of claim 11 wherein said first layer comprises one or more of polysiloxane, silica or glass.

* * * * *